(12) United States Patent
Tomaru

(10) Patent No.: US 10,035,420 B2
(45) Date of Patent: Jul. 31, 2018

(54) VEHICLE INSTRUMENT DEVICE

(71) Applicant: CALSONIC KANSEI CORPORATION, Saitama (JP)

(72) Inventor: Kazunori Tomaru, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 0 days.

(21) Appl. No.: 15/548,448

(22) PCT Filed: Sep. 4, 2015

(86) PCT No.: PCT/JP2015/075199
§ 371 (c)(1),
(2) Date: Aug. 3, 2017

(87) PCT Pub. No.: WO2016/125331
PCT Pub. Date: Aug. 11, 2016

(65) Prior Publication Data
US 2018/0022215 A1   Jan. 25, 2018

(30) Foreign Application Priority Data
Feb. 4, 2015   (JP) ................................ 2015-020598

(51) Int. Cl.
*B60Q 1/00*   (2006.01)
*B60Q 1/26*   (2006.01)
(Continued)

(52) U.S. Cl.
CPC ............. *B60K 35/00* (2013.01); *G01D 13/04* (2013.01); *G02B 6/0088* (2013.01);
(Continued)

(58) Field of Classification Search
CPC ........ B60K 35/00; B60K 37/00; B60K 37/02; B60K 37/04; B60K 2350/203;
(Continued)

(56) References Cited

U.S. PATENT DOCUMENTS

2003/0128957 A1   7/2003   Kalantar
2008/0266832 A1   10/2008  Tamura

FOREIGN PATENT DOCUMENTS

CA   2 403 887   7/2003
EP   1 327 818   7/2003
(Continued)

OTHER PUBLICATIONS

International Search Report dated Dec. 8, 2015 in International (PCT) Application No. PCT/JP2015/075199.

*Primary Examiner* — Jason Moon Han
(74) *Attorney, Agent, or Firm* — Wenderoth, Lind & Ponack, L.L.P.

(57) ABSTRACT

A vehicle instrument device includes a housing for attaching a dial plate, a light guide plate housing recess formed in the housing, a light guide plate that is housed in the light guide plate housing recess, and guides illumination light to the dial plate, a claw that fixes the light guide plate to the housing, and a press-fitting rib that is provided in a side surface of the light guide plate, and extends toward a side wall of the light guide plate housing recess. The press-fitting rib includes a tapered portion for increasing a height from a back side to a front side of the light guide plate housing recess and a tapered portion for decreasing a width from the back side to the front side of the light guide plate housing recess.

3 Claims, 4 Drawing Sheets

(51) Int. Cl.
*B60K 35/00* (2006.01)
*G01D 13/04* (2006.01)
*F21V 8/00* (2006.01)

(52) U.S. Cl.
CPC .. *B60K 2350/203* (2013.01); *B60K 2350/402* (2013.01); *B60K 2350/94* (2013.01)

(58) Field of Classification Search
CPC ........ B60K 2350/206; B60K 2350/402; B60K 2350/94; B60Q 3/00–3/18; G01D 13/04; G02B 6/0086; G02B 6/0088
USPC .... 362/23.07–23.14, 23.16–23.21, 489, 511, 362/555, 602–603, 632–634
See application file for complete search history.

(56) References Cited

FOREIGN PATENT DOCUMENTS

| | | |
|---|---|---|
| EP | 1 986 025 | 10/2008 |
| JP | 2003-270003 | 9/2003 |
| JP | 2008-270055 | 11/2008 |
| JP | 2010-8334 | 1/2010 |
| JP | 2014-62607 | 4/2014 |

VEHICLE INSTRUMENT DEVICE

CROSS-REFERENCE TO RELATED APPLICATION

The present application is based on and claims priority to Japanese Patent Application No. 2015-020598, filed on Feb. 4, 2015, the disclosure of which is hereby incorporated by reference in its entirety.

TECHNICAL FIELD

This invention relates to a vehicle instrument device.

BACKGROUND ART

An instrument panel is installed in a front portion of a passenger compartment in a vehicle such as an automobile. An instrument device or a vehicle instrument device for displaying information necessary for driving is installed in portions of the installment panel such as a driver's seat side portion and a central portion in a vehicle width direction (see Patent Literature 1, for example).

This vehicle instrument device includes at least a dial plate and a housing for attaching the dial plate. The vehicle instrument device is configured to emit light. An illumination structure of the vehicle instrument device includes a light source and a light guide plate that guides light or illumination light from the light source to the dial plate. In the illumination structure, a light guide plate housing recess is formed in the housing for attaching the dial plate, the light guide plate is housed in the light guide plate housing recess, and the light guide plate is fixed to the housing by a claw formed in the housing.

CITATION LIST

Patent Literature

Patent Literature 1: JP4468967B

However, in the vehicle instrument device described in Patent Literature 1, as the light guide plate is fixed to the housing with the claw, the light guide plate rattles due to the looseness of the claw caused by dimension errors, thermal deformation, and thermal distortion, causing abnormal sound.

It is, therefore, an object of the present invention to solve the above problem.

SUMMARY

Technical Problem

To achieve the above object, the present disclosure provides a vehicle instrument device including: a housing for attaching a dial plate; a light guide plate housing recess formed in the housing; a light guide plate that is housed in the light guide plate housing recess, and guides illumination light to the dial plate; a claw that fixes the light guide plate to the housing; and a press-fitting rib that is provided in a side surface of the light guide plate, and extends toward a side wall of the light guide plate housing recess, wherein the press-fitting rib includes a tapered portion for increasing a height from a back side to a front side of the light guide plate housing recess and a tapered portion for decreasing a width from the back side to the front side of the light guide plate housing recess.

Advantageous Effects

According to the present invention, abnormal sound caused by the rattling of the light guide plate due to the looseness of the claw can be prevented by providing the press-fitting rib. The press-fitting rib is also smoothly inserted by the tapered portion for increasing a height and the tapered portion for decreasing a width.

DESCRIPTION OF EMBODIMENTS

Hereinafter, an embodiment is described in details with reference to the drawings. FIGS. 1 to 6C are views each describing this embodiment.

First Embodiment

Hereinafter, a configuration of this embodiment is described.

An instrument panel is installed in a front part of a passenger compartment in a vehicle such as an automobile. An instrument device or a vehicle instrument device for displaying information required for driving is installed in portions of the instrument panel such as a driver's seat side portion and a central portion in a vehicle width direction.

Figure 1:
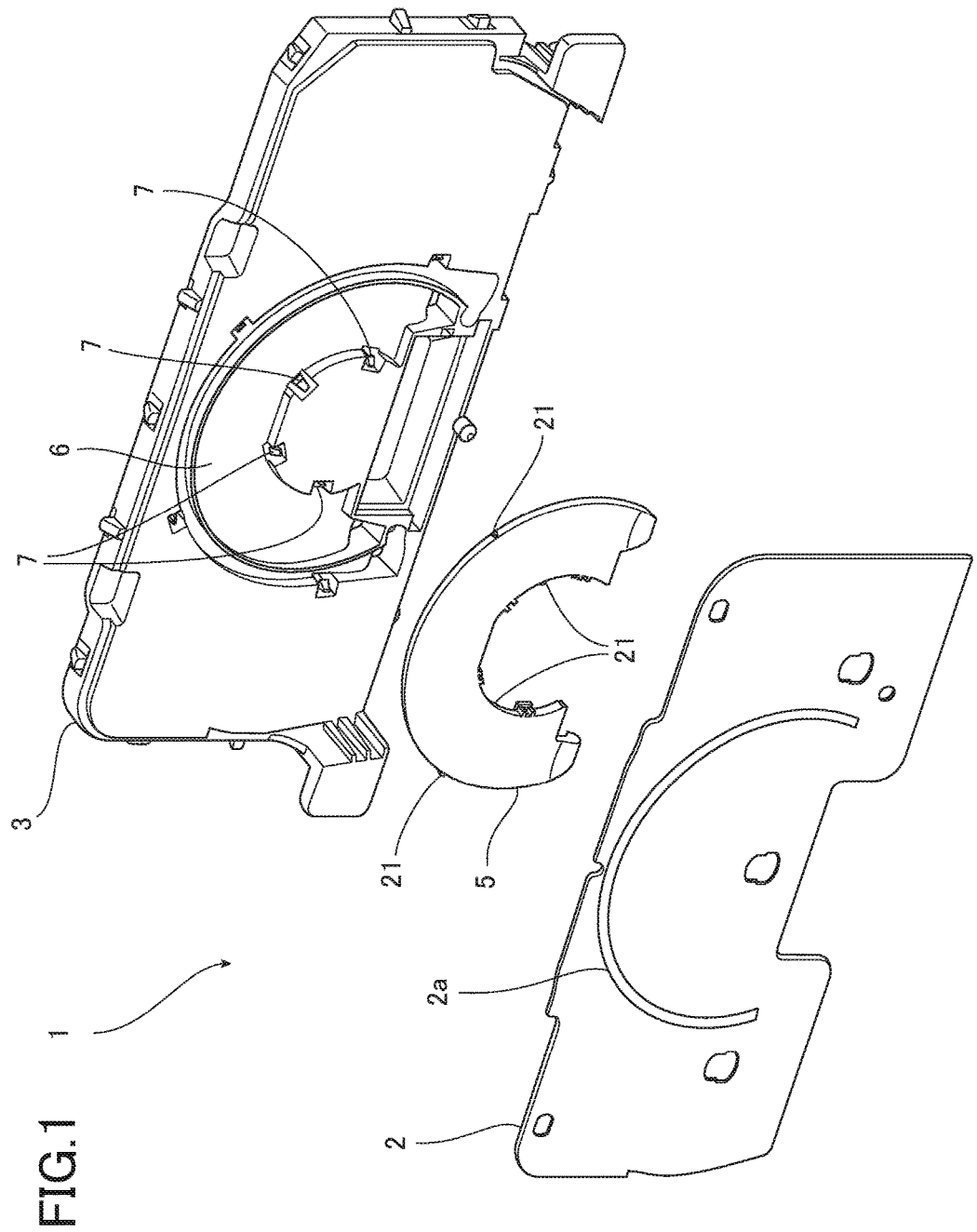
FIG. 1 is an exploded perspective view illustrating a vehicle instrument device according to the present embodiment.
Figure 2:
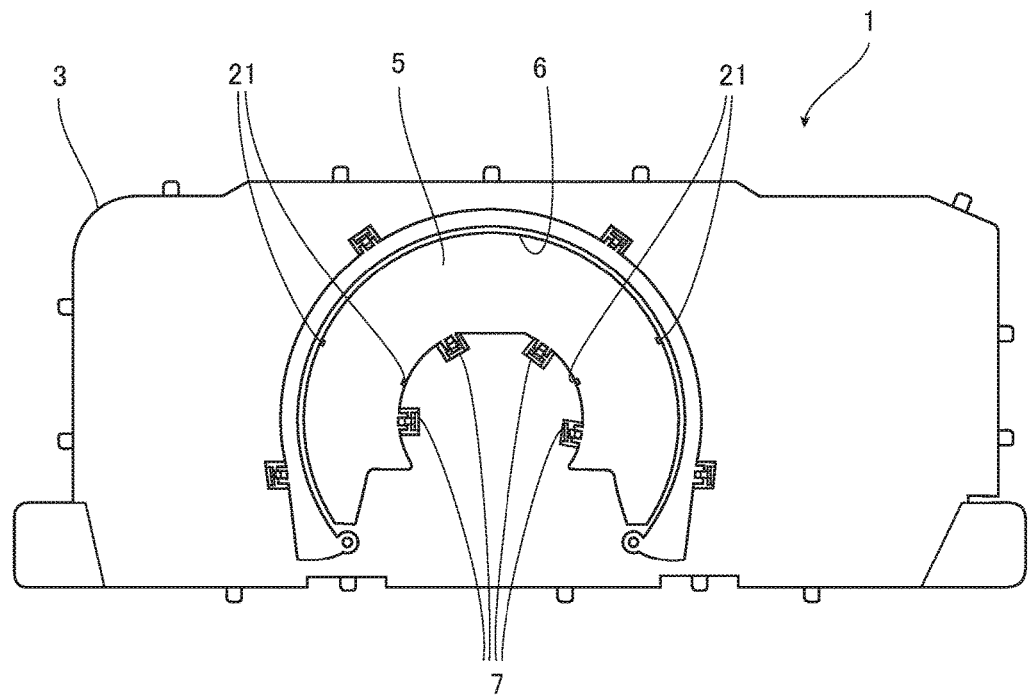
FIG. 2 is a front view of a housing in FIG. 1.
Figure 3:
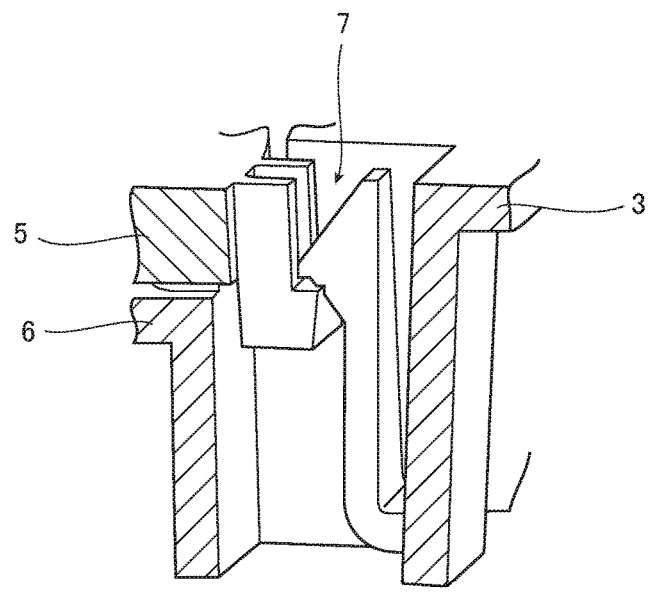
FIG. 3 is an enlarged perspective view of a claw in FIG. 2.

As illustrated in the exploded perspective view of FIG. 1 and the front view of FIG. 2, a vehicle instrument device 1 includes at least a dial plate 2 and a housing 3 for attaching the dial plate 2. The vehicle instrument device 1 is configured to emit light. An illumination structure of the vehicle instrument device 1 includes at least a light source and a light guide plate 5 for guiding light or illumination light from a light source to the dial plate 2. A light guide plate housing recess 6 is formed in the housing 3 for attaching the dial plate 2, the light guide plate 5 is housed in the light guide plate housing recess 6, and the light guide plate 5 is fixed to the housing 3 with a claw 7 (see FIG. 3).

The dial plate 2 includes a light transmission part such as a region defining line 2a and a scale. For example, the region defining line 2a is formed in an arc shape, and the scale is formed inside the arc region defining line 2a along the region defining line 2a. An indicating needle that indicates the scale is provided to be rotatable in the region defining line 2a. The dial plate 2 is attached to the front surface of the housing 3. The housing 3 is made of, for example, white resin to obtain high refractive index. The light guide plate 5 is made of transparent resin. The light guide plate 5 is made of a material harder than that of the housing 3. In this embodiment, the light guide plate 5 has an arc shape. The light guide plate housing recess 6 is an arc recess corresponding to the light guide plate 5. In this case, the light guide plate 5 and the light guide plate housing recess 6 are provided for illuminating the region defining line 2a while another light guide plate 5 and another light guide plate housing recess 6 are provided for illuminating the dial. In this embodiment, an example for illuminating the dial is described. The claw 7 is provided at least one of the housing 3 and the light guide plate 5 (see FIG. 3). In this embodiment, the claw 7 is provided in the housing 3 to be locked to several portions of the inner circumference edge portion of the light guide plate 5.

This embodiment includes the following configurations in addition to the above basic configurations.

Figure 4:
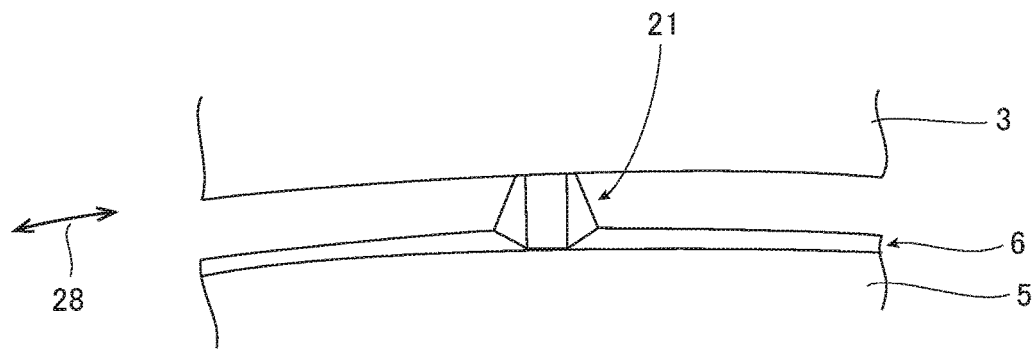
FIG. 4 is a plan view of a press-fitting rib in FIG. 2.
Figure 5:
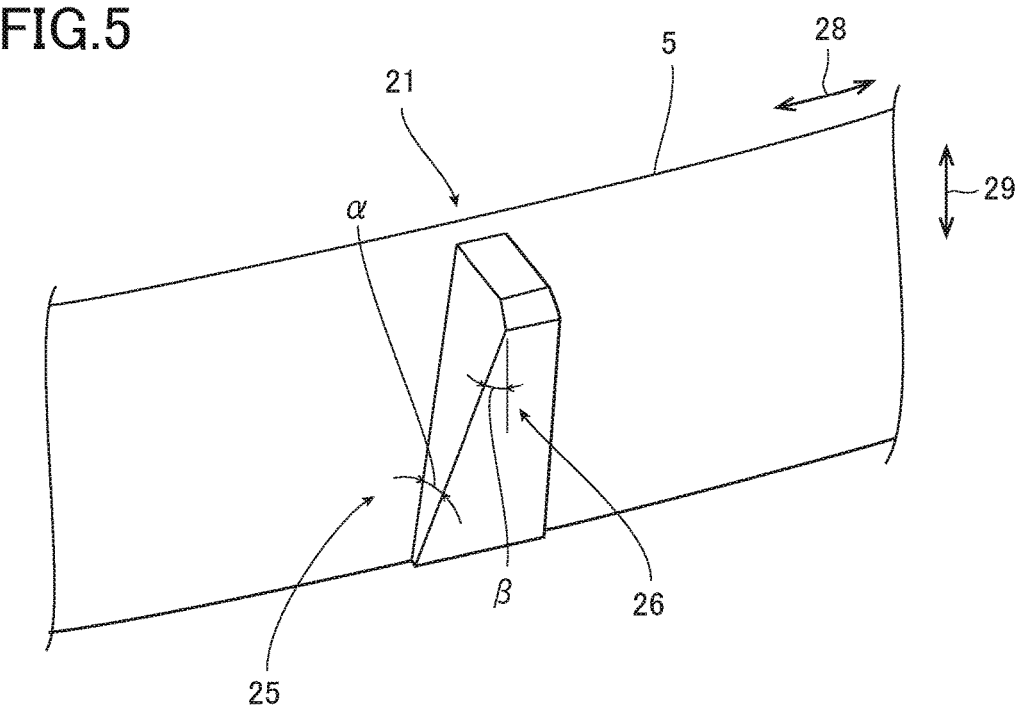
FIG. 5 is a perspective view of the press-fitting rib in FIG. 4.
Figure 6A:
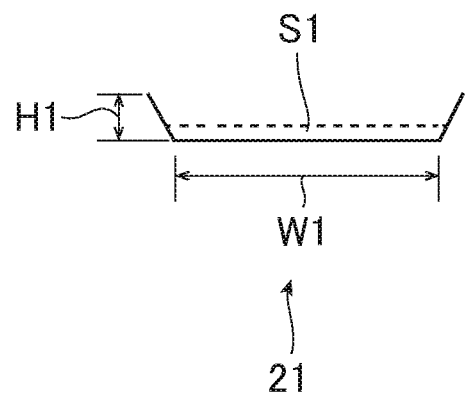
FIG. 6A is a sectional view of a bottom portion (back side) of the press-fitting rib in FIG. 4.
Figure 6B:
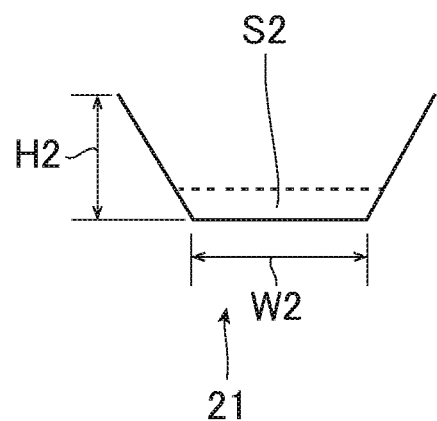
FIG. 6B is a sectional view of a middle portion of the press-fitting rib in FIG. 4.
Figure 6C:
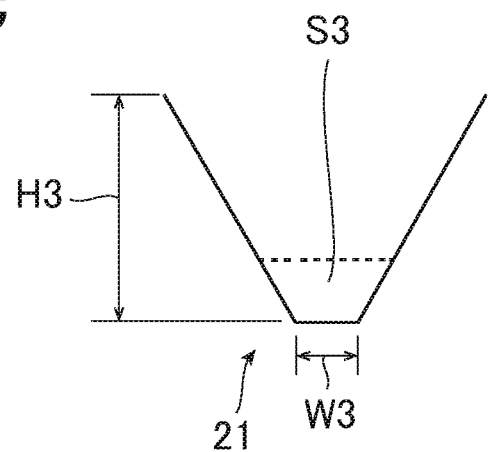
FIG. 6C is a sectional view of a top portion (front side) of the press-fitting rib in FIG. 4.

(1) As illustrated in FIGS. 4, 5, a side surface of the light guide plate 5 is provided with a press-fitting rib 21 extending toward a side wall of the light guide plate housing recess 6. As illustrated in FIG. 5, the press-fitting rib 21 includes a tapered portion 25 for increasing a height and a tapered portion 26 for decreasing a width. As illustrated in FIGS. 6A to 6C, the tapered portion 25 for increasing a height has heights H1 to H3 which increase from the back side to the front side of the light guide plate housing recess 6 (H1<H2<H3). The tapered portion 26 for decreasing a width has widths W1 to W3 which decrease from the back side to the front side of the light guide plate housing recess 6 (W1>W2>W3).

It is preferable for the press-fitting rib 21 to be positioned to fasten the light guide plate 5 in all directions. In this embodiment, as illustrated in FIG. 2, a pair of ribs 21 is provided in an inner circumference surface and an outer circumference surface of the arc light guide plate 5, respectively. Moreover, the plural pairs of ribs 21 are provided in different positions of the arc light guide plate 5 in a circumference direction 28. In addition, FIG. 2 only shows the positions of the press-fitting ribs 21.

The tapered portion 25 for increasing a height gradually narrows in the press-fitting direction of the press-fitting rib 21 while the tapered portion 26 for decreasing a width gradually narrows in the direction opposite to the press-fitting direction.

The tapered portion 25 for increasing a height is an inclined surface in which the heights H1 to H3 linearly vary. The height of the most part of the tapered portion 25 for increasing a height is higher than a space between the light guide plate housing recess 6 and the light guide plate 5.

The tapered portion 26 for decreasing a width is an inclined surface in which the widths W1 to W3 linearly vary. The width of a front side narrow portion of the tapered portion 26 for decreasing a width is substantially equal to a thickness of the housing 3 or less and the width of a back side wide portion of the tapered portion 26 for decreasing a width is substantially equal to a thickness of the housing 3 or more.

(2) It is preferable for a tapered angle α of the tapered portion 25 for increasing a height to be set to equal to a tapered angle β of the tapered portion 26 for decreasing a width (α=β).

(3) Alternatively, areas S1 to S3 of the portions of the press-fitting rib 21 which are wedged into the side wall of the light guide plate housing recess 6 may be the same in each portion in a depth direction 29 (S1=S2=S3).

The areas S1 to S2 of the wedged portions may be set according to the tapered angle α of the tapered portion 25 for increasing a height and the tapered angle β of the tapered portion 26 for decreasing a width of the press-fitting rib 21.

According to this embodiment, the following effects are achieved.

The vehicle instrument device 1 is installed in the portions of the instrument panel such as the driver's seat side portion and the central portion in the vehicle width direction, and displays information required for driving. The light or the illumination light from the light source is guided to the dial plate 2 through the light guide plate 5 to illuminate the dial plate 2 by turning on the light source. The light guide plate 5 is housed in the light guide plate housing recess 6 provided in the housing 3, and is fixed to the housing 3 with the claw 7.

In this case, if the claw 7 loosens due to dimension errors, thermal deformation, or thermal distortion, the light guide plate 5 rattles, causing abnormal noise.

First Effect

The press-fitting rib 21 is provided in the light guide plate 5. The press-fitting rib 21 projecting from the side surface of the light guide plate 5 is wedged into the side wall of the light guide plate housing recess 6 by housing the light guide plate 5 in the light guide plate housing recess 6, so that the press-fitting rib 21 is pressed to the side wall of the light guide plate housing recess 6. Therefore, the rattling of the light guide plate 5 due to the looseness of the claw 7, which causes abnormal noise, can be prevented by the press-fitting rib 21.

In this embodiment, the press-fitting rib 21 includes the tapered portion 25 for increasing a height. The amount (depth) of the press-fitting rib 21 which is wedged into the side wall of the light guide plate housing recess 6 gradually increases from the back side to the front side of the light guide plate housing recess 6 when the press-fitting rib 21 is inserted. As a result, the wedge effect of the tapered portion 25 for increasing a height toward the front side prevents the press-fitting rib 21 from loosening.

The press-fitting rib 21 also includes the tapered portion 26 for decreasing a width. The width of the press-fitting rib 21 which contacts the side wall of the light guide plate housing recess 6 gradually decreases from the back side to the front side of the light guide plate housing recess 6 when the press-fitting rib 21 is inserted. As a result, the anchor effect of the tapered portion 26 for decreasing a width toward the back side prevents the press-fitting rib 21 from being slipped or dislocated.

By the combination of the increase in the wedged amount (depth) of the tapered portion 25 for increasing a height and the decrease in the contact width of the tapered portion 26 for decreasing a width from the back side to the front side of the light guide plate housing recess 6, the press-fitting rib 21 can be smoothly inserted.

In addition, the press-fitting rib 21 may be provided in the housing 3. However, when the press-fitting rib 21 is provided in the housing 3, the reflection of the light emitted from the light guide plate 5 may be disturbed by the opaque press-fitting rib 21. When the press-fitting rib 21 is provided in the transparent light guide plate 5, it is advantageous in terms of the light guide because the light is not disturbed.

Second Effect

The tapered angle α of the tapered portion 25 for increasing a height may be set to equal to the tapered angle β of the tapered portion 26 for decreasing a width. Thereby, the increase amount of the height of the press-fitting rib 21 has a correlation to the decrease amount of the width of the tapered portion 26 for decreasing a width, so that the press-fitting rib 21 can be further smoothly inserted.

Third Effect

Alternatively, the tapered angle α of the tapered portion 25 for increasing a height and the tapered angle β of the tapered portion for decreasing a width may be set or adjusted, such that the areas S1 to S3 of the portions of the press-fitting rib 21 which are wedged into the side wall of the light guide plate housing recess 6 are the same in each portion in the depth direction 29. As the areas S1 to S3 of the portion of the press-fitting rib 21 which are wedged into the side wall of the light guide plate housing recess 6 are the same in each position of the press-fitting rib 21, the insertion force when inserting the press-fitting rib 21 can be uniformed. As a result, the assembling performance of the light guide plate 5 relative to the housing 3 can be improved.

While the embodiment has been described in detail with reference to the drawings, the embodiment is only illustrative and exemplary of the invention. Accordingly, the invention is not limited to the configurations of the embodiment. It will be appreciated that any design change and the like that do not depart from the gist should be included in the invention. It is to be understood that, when multiple configurations are incorporated in each of the embodiment, for example, possible combinations of these configurations are included in the invention without any particular description. It should further be understood that, when multiple embodiments and modifications are disclosed as those of the invention, any possible combinations of configurations among these embodiments and modifications are considered to be included in the invention without any particular description. Moreover, configurations disclosed in the drawings are naturally considered to be included in the invention without any particular description. Further, the term "and/or the like (such as)" is used to indicate that any equivalent is also included. Also, when such a term as "substantially", "about", or "approximately" is used, this means that a value or the like within a range or accuracy which is reasonably acceptable is also included.

DESCRIPTION OF REFERENCE SIGN

1 Vehicle instrument device
2 Dial plate
3 Hosing
5 Light guide plate
6 Light guide plate housing recess
7 Claw
21 Press-fitting rib
25 Tapered portion for increasing a height
26 Tapered portion for decreasing a width
H1 Height
H2 Height
H3 Height
W1 Width
W2 Width
W3 Width
S1 Area
S2 Area
S3 Area
α Tapered angle
β Tapered angle

The invention claimed is:

1. A vehicle instrument device comprising:
   a housing for attaching a dial plate;
   a light guide plate housing recess formed in the housing;
   a light guide plate that is housed in the light guide plate housing recess, and guides illumination light to the dial plate;
   a claw that fixes the light guide plate to the housing; and
   a press-fitting rib that is provided in a side surface of the light guide plate, and extends toward a side wall of the light guide plate housing recess, wherein
   the press-fitting rib includes a tapered portion for increasing a height from a back side to a front side of the light guide plate housing recess and a tapered portion for decreasing a width from the back side to the front side of the light guide plate housing recess.

2. The vehicle instrument device according to claim 1, wherein
   a tapered angle of the tapered portion for increasing a height is set to be equal to a tapered angle of the tapered portion for decreasing a width.

3. The vehicle instrument device according to claim 1, wherein
   areas of portions of the press-fitting rib which are wedged into a side wall of the light guide plate housing recess are the same in each portion in a depth direction.

* * * * *